May 5, 1953

R. WINCH 2,637,492

TAXIMETER

Filed April 25, 1947

INVENTOR:
RONALD WINCH

By: [signature]
his Atty's

May 5, 1953 — R. WINCH — 2,637,492
TAXIMETER
Filed April 25, 1947 — 3 Sheets-Sheet 3

INVENTOR:
RONALD WINCH
By: *his Atty's*

Patented May 5, 1953

2,637,492

UNITED STATES PATENT OFFICE 2,637,492

TAXIMETER

Ronald Winch, Winnipeg, Manitoba, Canada, assignor of one-third to William Sivak and one-third to Richard Wunsch, both of Winnipeg, Manitoba, Canada Application April 25, 1947, Serial No. 743,918

9 Claims. (Cl. 235—30)

The present invention relates to fare indicating meters for taxi cabs commonly known as taxi meters, an object of the invention being to provide a device of the character herewithin described wherein an electrical source of energy is employed for actuation of the visible fare indicating assembly, regardless of whether the meter is functioning via the speedometer cable connected to a road wheel of the associated cab, or in other words on a "distance basis," or on a "time basis" (when the associated cab is waiting or travelling below a predetermined rate of speed), under which circumstances the periodicity of the electrical energizing force is controlled by a chronometric action within the meter, in the present instance in the form of a conventional, electro-mechanical clock movement.

A further object of the present invention is to provide a device of the character herewithin described wherein the electro-mechanical clock movement referred to in the last preceding paragraph is only employed for the purpose of operating a switch actuating component, by means of which the periodicity of the aforesaid, electrical source of power is determined when the meter is registering fares on a "time basis" as aforesaid, instead of directly actuating the fare indicating assembly as is the conventional practice, in view of which arrangement an inexpensive clock movement such as the conventional automobile dashboard electro-mechanical movement herein described may be employed, thus, as an additional advantage, eliminating the necessity for frequent re-winding as is the case with conventional taxi-meter clock movements.

A further object of the present invention is to provide a taxi meter which is of significantly simplified construction in regard to the number and interaction of its components by comparison with conventional forms of taxi meters, and in virtue of which simplification greater accuracy in fare registration is obtainable, particularly so after long use when any wear in the comparatively few components will be multiplied by a smaller totality than is the case with conventional clock movements.

A further object of the present invention is to provide a taxi meter of greatly reduced physical proportions in comparison with conventional forms and in which, by virtue of the aforesaid electrical source of power for direct actuation of the fare indicating assembly, such assembly may be mounted on the dashboard with a large part of the mechanism remote therefrom whereby the large obstruction constituted by conventional taxi meters may be eliminated.

A further object of the present invention is to provide in combination with an inexpensive, mass produced and conventional electric clock movement of insignificant mechanical strength insofar as actuating external mechanisms are concerned, means for augmenting the movement initiated by said clock movement upon an external switch actuated component, as soon as the switch has been closed, for re-opening the same during the continued, rotary progression of the said component, and this with conspicuous simplicity and a minimum of effort. With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

In the drawings like characters of reference indicate corresponding parts in the different figures.

Figure 1:
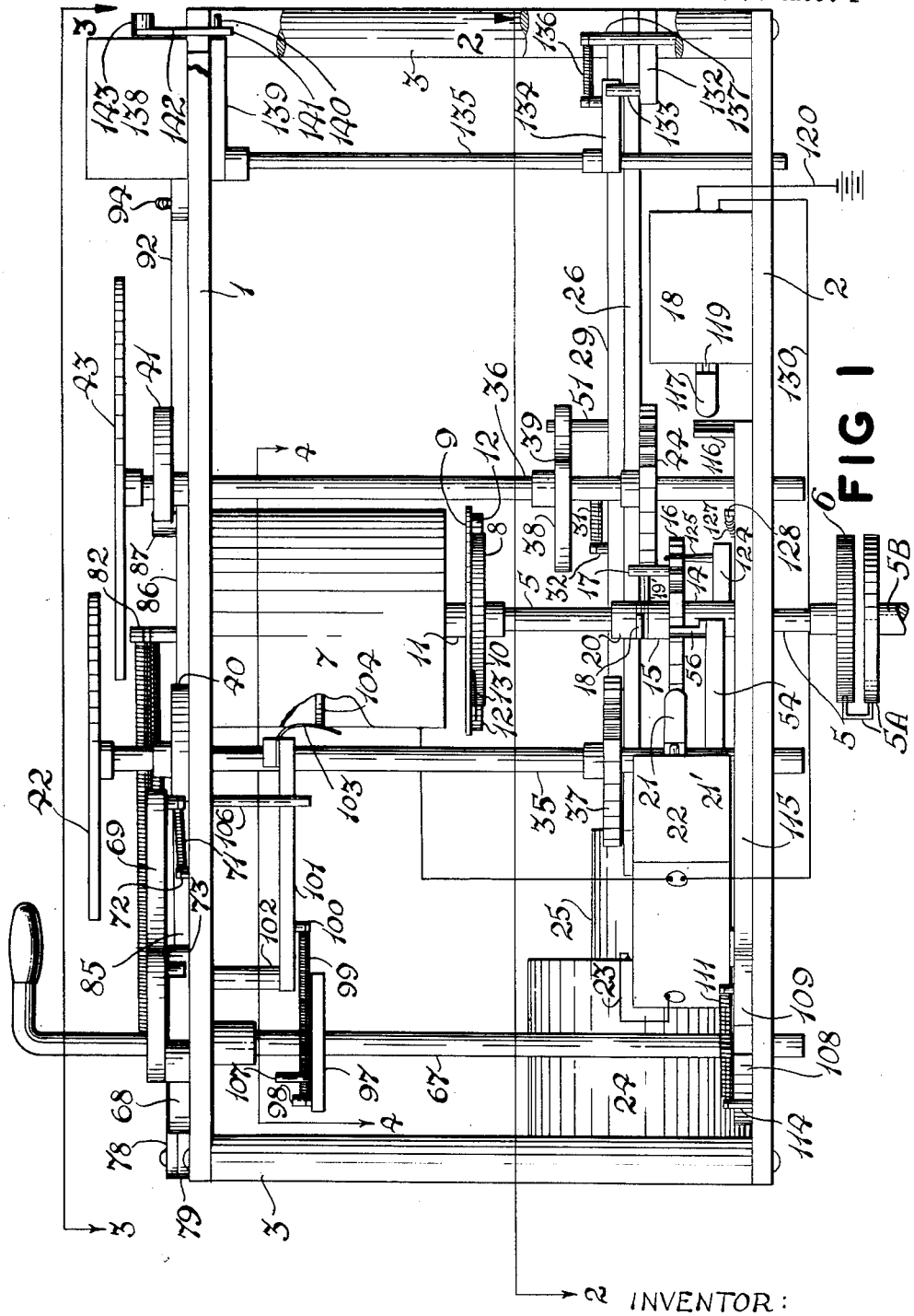
Figure 1 is an under-side plan view of the taxi meter herewithin described.

The mechanism of the taxi meter hereinafter to be described is predominantly contained between rectangular anterior and posterior plates 1 and 2 respectively, the same constituting, together with the tie-rods 3 at each corner of the aforesaid plates, a boxing collectively designated 4. Journalled in the plate 2 is a road wheel coupled drive shaft 5 connected through a conventional set of gears, of which it is only considered necessary to depict the finely ratchetted gear 6 forming part of a conventional clutch action 5A connected to the conventional speedometer cable or shaft 5B and which of course is operatively connected to the wheels of the associated cab. Thus it will be appreciated that while shaft 5 is correctly describable as road-wheel coupled, it is also an intermediate member, being so situated co-axially between shafts 5B and 11 hereinafter referred to.

The intermediate shaft 5 is also connected to a chronometric action collectively designated 7 via a clutch collectively designated 8. The action 7 in the present instance consists of a conventional, electro-mechanical, self-winding clock movement such as are commonly installed on automobile dashboards and connected to the associated automobile battery.

The clutch 8 in detail comprises the plates 9 and 10 the former of which is keyed to the chronometrically coupled shaft 11 which is part of the aforesaid clock movement. The plate 10 has a finely ratchetted perimeter and is keyed to driveshaft 5. Pawls 12 mounted upon plate 9 engage the aforesaid ratchetted perimeter under bias by the springs 13.

Freely mounted for independent rotation on shaft 5 between the collars 14 and 15 is what is designated as a circuit closing or switch actuating component 16 in the form of a ratchet wheel on which is eccentrically mounted a projection 17 in the form of a pin or stud. Adjacent the aforesaid component and secured for rotation to shaft 5 is what is designated as a radial sweep clutch 18, the arms 19 and 19' whereof may be adjusted with respect to their angular relationship via the aforesaid collar 15, and collar 20 to one of which each of the aforesaid arms are secured, it being understood that the collars may be friction-locked to shaft 5 by means of set-screws.

To one side of the component 16 is a solenoid actuating switch 22 of conventional construction and having a leaf spring 21 projecting therefrom engageable with the teeth of component 16 and depressible thereby to actuate the plunger 21' and close a circuit via lead 23 to an electrically energizable unit 24 in the form of a solenoid.

The plunger 25 of the aforesaid solenoid is secured to an endwise shiftable tongue 26 positioned between roller guides 27 and having pivotally connected thereto at the point 28 a pawl 29 held in loaded contact with stud 30 projecting from tongue 26 under the influence of spring 31 anchored to the aforesaid stud and to stud 32 on the pawl. Tongue 26 is also maintained in the position of the accompanying drawings by spring 33 anchored to the upper one of the guide rollers 27 and to the tongue itself at point 34.

Journalled between the plates 1 and 2 are shafts 35 and 36, shaft 35 having keyed thereon a ratchet wheel 37, while shaft 36 has keyed thereon a disc 38 provided with a single recess 39. Also keyed to shafts 35 and 36 upon the anterior side of plate 1 are the volute cams 40 and 41. Anterior to the cams again and also keyed to shafts 35 and 36 are conventional, inscribed fare indicating discs 42 and 43 of which the former indicates dollars, and the latter cents or multiples thereof.

Also keyed for rotation upon shaft 36 is a ratchet wheel 44 engageable by pawl 45 pivotally connected at the point 46 to tongue 26 and held against stud 47 projecting from tongue 26 by spring 48 anchored at one end 49 to tongue 26 and at the other to the stud 50 projecting from the pawl. Projecting from pawl 29 is a stud 51, and from a consideration of the accompanying drawings in relation to the parts 35 to 51 inclusive, herein designated as the visible fare indicating assembly, it will be apparent that when the plunger 25 is drawn leftwardly, with respect to the accompanying Figure 2, following depression of plunger 21' via component 16 and spring 21 to energize solenoid 24, tongue 26 will similarly be drawn leftwise. Such action will cause pawl 45 to rotate ratchet 44 counterclockwise one tooth, with all these components on shaft 36 including the indicator dial 43 which will accordingly spring into visibility the next fraction of a dollar within a window frame which of course is conventional and forms no part of the present invention. I call the main parts 26, 29, 45, and part 54 (hereinafter referred to) collectively, my primary dial actuating unit.

Simultaneously with the action described in the last preceding paragraph pawl 29 will move leftwardly, but also be levitated slightly about the pivot point 28 in virtue of stud 51 riding against the perimeter of disc 38. Hence at each leftward movement it will escape the teeth of ratchet wheel 37 except once in each revolution of disc 38 when the stud 51 will drop into recess 39 and hence move leftwardly in true linear movement without levitation. On that occasion pawl 29 will engage one of the teeth of ratchet wheel 37 and rotate same leftwardly one tooth thereby bringing into visibility through a conventional viewing panel or frame the next dollar in virtue of rotation of the "dollars" dial 42.

Secured to the interior face of the plate 2 is a check-block 52, and projecting towards the interior face aforesaid is a stud 53 secured to tongue 26. Stud 53 is intercepted by block 52 to limit the rightward movement of the tongue. Stud 53 also serves to actuate counterclockwise the supplementary means 54 for actuating the component 16, such means comprising a lever pivotally connected to plate 2 at the point 55 and having on the lower end thereof a pawl 56, the upper end being biased clockwise against stud 53 by the spring 57 anchored to post 58 projecting inwardly from plate 2. In operation means 54 function as follows:

As soon as spring 21 depresses plunger 21' to complete the solenoid actuating circuit, tongue 26 travels leftwardly as already described. Accordingly, lever 54 is rotated to a limited extent counterclockwise with respect to Figure 2 by the stud 53. This will cause pawl 56 to impinge against the riser portion 59 of each of the teeth of component 16 and assist rotation of the same against the somewhat increased resistance of spring 21 as the peaks 60 of the ratchet teeth of component 16 ride therepast. When the peak of a given tooth has passed the free end of spring 21 allowing the same to release plunger 21' so that the associated circuit is broken and tongue 26 may endshift rightwardly under the influence of spring 33, lever 54 will travel clockwise under the influence of spring 57 to assume the position illustrated. This arrangement has been resorted to primarily to break the associated electrical circuit and to decrease the effort required to rotate shaft 5 by the clock movement 7 when the taxi meter is registering on a time basis. When shaft 5 is being rotated through the agency of the speedometer cable (or road-wheel-coupled shaft 5B) via gear 6, the supplementary means 54 continue to function as aforesaid but in a superfluous capacity. In this context it is appropriate to refer to the check pawls 61 and 62 pivoted on the posts 63 and 64 projecting inwardly from plate 2 and held biased against ratchets 37 and 44 by springs 65 and 66 to sustain the aforesaid ratchet against backlash.

The taxi meter is illustrated in the non-operative position in the accompanying drawings, and is started by rotation of the spindle 67 to which may be secured any desired form of handle. Keyed to the aforesaid spindle and against the anterior surface of plate 1 is a compound cam 68 of the profile clearly illustrated in Figure 3. Adjacent the cam 68 is a three-stage lock 69 pivoted for rotation at 70 and being biased counterclockwise by means of the spring 71 anchored to plate 1 at the point 72 at one end thereof and at the other to the free end of the aforesaid lock. Also provided as a detail of the lock 69 is the stud 73 selectively engageable with recesses 74, 75 or 76 of cam 68 when rotated counterclockwise with respect to the accompanying Figure 3 from the neutral, or inactive position illustrated.

Pivotally secured at the point 77 against the anterior surface of plate 1 and in lapping relationship is a pair of spring loaded cam followers 78 and 79 of the configuration clearly depicted and capable of counterclockwise rotation under the influence of cam 68 against the resistance of springs 80 and 81 respectively anchored in common at point 82 on plate 1 and to the nose-pieces 83 and 84 respectively. Integral and coterminous with the aforesaid cam followers are reset levers 85 and 86 engageable via the rollers 87 with the cams 40 and 41 respectively.

Figure 3:
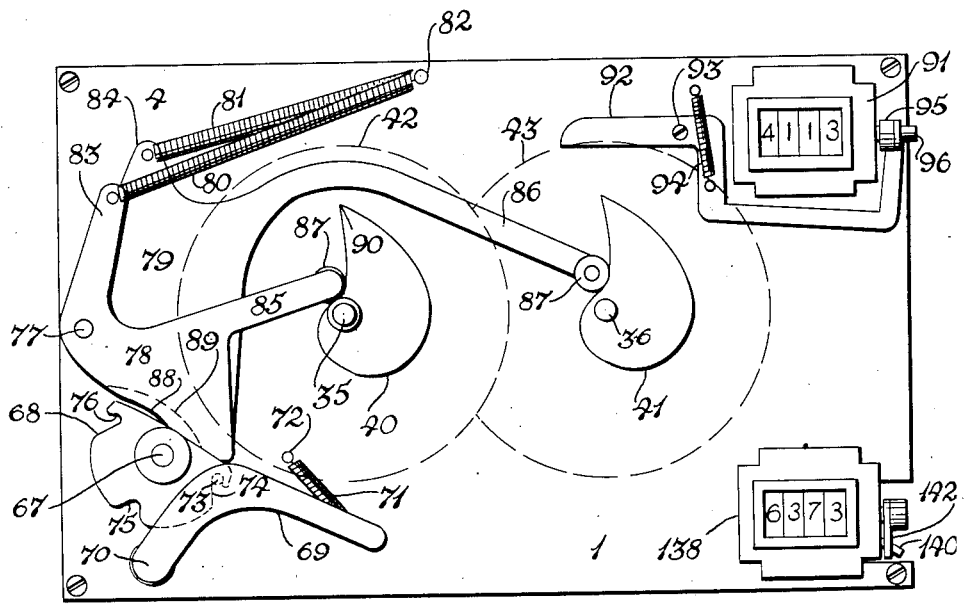
Figure 3 is a frontal elevation of the taxi meter herewithin described, as viewed from the aspect 3—3 of Figure 1, but reduced in size in comparison therewith.

In view of the foregoing it will be apparent that in the non-operative position of Figure 3, dials 42 and 43 cannot rotate. When, however, the cam 68 is rotated counterclockwise to its full extent, or in other words till it is locked against further rotation by the engagement of stud 73 with recess 76, the reset levers 85 and 86 will be lifted clear of cams 40 and 41. Such position represents the operative position of the present taxi meter. By virtue of the respective contours in the region 88 and 89 of the cam followers 78 and 79, it will be apparent that lever 85 will be rotated through a greater circumference than will lever 86 to clear the crest 90 of cam 40.

In this context it will be noted that a conventional counter 91 is provided at the top righthand corner of plate 1 to register each trip upon rotation of cam 68 as aforesaid through the agency of lever 86, which, when elevated by rotation as aforesaid engages lever 92 pivoted to plate 1 at point 93 so as to rotate the same clockwise against the resistance of spring 94 so as to operate a short lever 95 connected to the conventional winding stem 96 of the counter.

Figure 4:
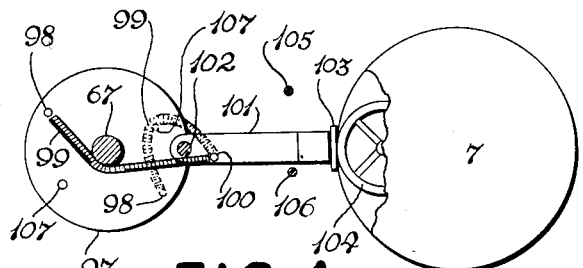
Figure 4 is a sectional elevation on the line 4—4 of Figure 1 but reduced in size with respect thereto.

Also keyed for rotation to shaft 67 and best illustrated in the accompanying Figure 4 is a disc 97 having a post 98 positioned near the rim whereof and to which is secured one end of a spring 99. The opposite end of this spring is anchored to a post 100 projecting from a brake lever 101 pivoted for rotation to post 102 secured to and projecting inwardly from plate 1. Upon the free end of lever 101 is a brake shoe 103 preferably of very light gauge flexible metal engageable with the balance wheel 104 of the adjacent clock movement 7. Lever 101 is limited in respect of its rotary movement between the projecting stops 105 and 106.

Also secured eccentrically to disc 97 and projecting therefrom is an intercepting post 107 and from a consideration of the immediately preceding structure concurrently with contemplation of the accompanying Figure 4, it will be apparent that when disc 97 is rotated counterclockwise by rotation of spindle 67 from the inactive position illustrated, post 107 will intercept spring 99 as it also rotates as between the anchorage point 98 and the point where it contacts spindle 67, and at the same time relaxes. As the disc proceeds on round, spring 99 will be acutely angulated around post 107 as indicated in phantom lines in Figure 4. Thus lever 101 will be snapped upwardly to disengage shoe 103 from balance wheel 104, immediately following which the clock 7 will be started.

Figure 2:
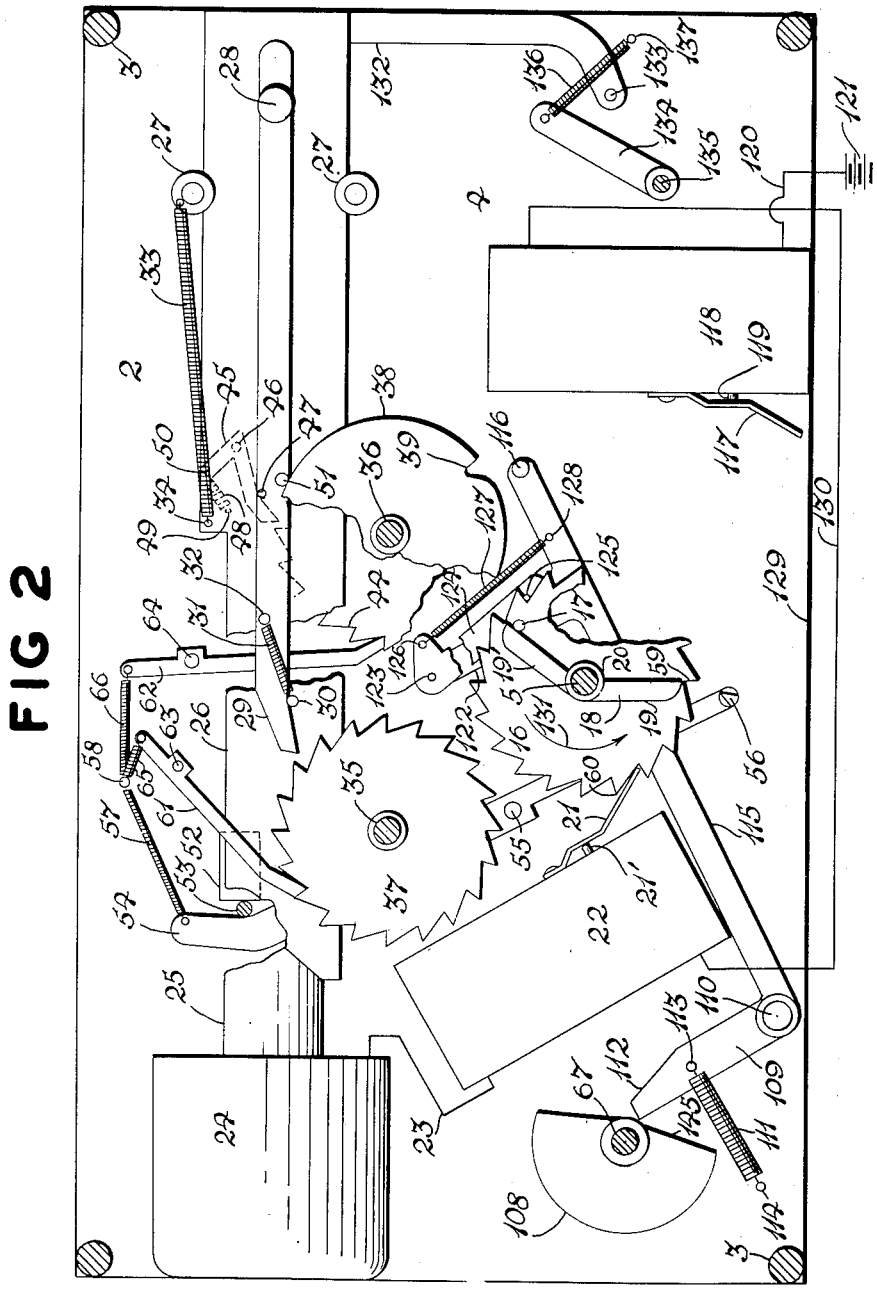
Figure 2 is a sectional elevation on the line 2—2 of Figure 1.
Figure 5:
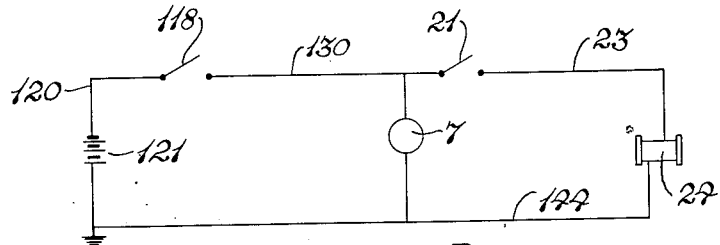
Figure 5 is a circuit diagram of the electrical wiring system of the present taxi meter.

The elements designated from 67 to 107 inclusive but excepting those designated from 91 to 96 inclusive represent what is herein defined as the meter starting assembly. Additionally, however, there is secured to spindle 67 a sector-cam 108 designed to actuate a mainswitch opening and closing element in the form of an angulated lever 109 pivotally attached to plate 2 at the point 110. This lever, in the inactive position of Figure 2 is held thus biased by spring 111 anchored at one end to the portion 112 of lever 109 at the point 113, and at the other to plate 2 at the point 114. Projecting from the free end of the main arm 115 of lever 109 is a dog 116 capable, upon clockwise rotation of the lever under the influence of counterclockwise rotation of cam 108, of contacting and depressing the leaf spring 117 secured to main switch 118. When the aforesaid leaf spring is compressed, plunger 119 is actuated to close a circuit 120 between the cab battery 121 and solenoid switch 21. When the main switch 118 is open, as indicated in Figure 5, clock 7 is inactive and no current is flowing in any component of the meter.

Connected to the main arm 115 of lever 109 is a bracket or standard 122, to the distal end of which is pivoted (as at 123), what is herein designated as a markup compensating lever 124 having a projecting pin 125 upon the free end thereof engageable with the teeth of component 16. To the nose 126 of the aforesaid lever is anchored one end of a spring 127, the other end thereof being anchored to the lever arm 115 at point 128 so that the lever is held biased against component 16.

The purpose of the aforesaid markup compensating lever is as follows: When the meter is in operating position, cam 108 is rotated counterclockwise so that the arm 115 is lying parallel with the lower edge 129 of plate 2, plunger 119 being depressed as previously indicated to close the circuit 130 between switches 118 and 21. In this position dog 125 is out of contact with the ratchet of component 16, since at this point it should be explained that the spring anchorage point of nose 126 consists of a stud projecting towards plate 2, which stud is intercepted by standard 122 against the bias of spring 127 tending to rotate lever 124 clockwise. When lever arm 115 is parallel with edge 129 aforesaid, it will clearly be recognized that projection 125 is also clear below the perimeter of component 16.

Upon rotating the cam 68 clockwise however at the end of a trip, the simultaneous rotation of cam 108 will allow spring 111 to rotate the member 109 counterclockwise into the position of Figure 2. In doing so, the component 16, which as already stated is free on shaft 5, is rotated counterclockwise by member 125, which, as it rises, comes into engagement with one of the teeth of the aforesaid component. Hence the projection 17 on component 16 is rotated to the extent of the arc between arms 19 and 19'.

As already stated, the radial sweep clutch 18 of which the principal components are the aforesaid arms is secured for rotation to shaft 5, and hence, in operation of this meter it is to be understood that the component 16 is rotated by arm 19 travelling in the counterclockwise direction indicated by arrow 131 in Figure 2, bearing against the projection 17. According to the laws governing the operation of taxi cabs in most districts however, the initial figure in cents which appears behind the conventional window of the meter upon the starting of the taxi meter is a markup figure, as for example 35 cents for which the passenger has not at the moment of starting the meter, received value.

Accordingly mechanism is required to be incorporated which will prevent actuation of the fare dials 42 and 43 until a certain distance has been travelled, or until the cab has been crawling or waiting under hire by the passenger for a predetermined length of time. Such distance or such length of time is accordingly represented in the present meter by the time required for arm 19 to rotate counterclockwise as far as projection 17 either under the influence of the speedometer cable actuated gear 6, or the clock mechanism 7 via clutch 8 as already described. Thereafter component 16 will obviously be rotated to actuate switch 22 and solenoid 24 as already herewithin described.

Upon tongue 26 is an arm 132 engageable via the projecting stud 133 with a lever 134 secured for rotation on shaft 135. Lever 134 is held biased clockwise by spring 136 projecting from the post 137 of plate 2, and accordingly, when the tongue 26 is shifted endwise leftwardly with respect to Figures 1 or 2, lever 134 will be rotated counterclockwise by projection 133 and thus similarly rotate shaft 135 to actuate a counter 138 by rotation of lever 139 keyed to shaft 135. The reduced end 140 of lever 139 is received between the bifurcated ends 141 of a lever 142 to actuate the conventional shaft 143 of the aforesaid counter.

As stated hereinabove, when the taxi meter is in operation, compound cam 68 is rotated counterclockwise so that stud 73 is in engagement with recess 76, and hence the reset levers 85 and 86 are held elevated clear above the rotary arc of the peaks 90 of cams 40 and 41. At the conclusion of the trip, however, and while waiting for payment, for example, the operator will rotate cam 68 clockwise so that stud 73 is in engagement with intermediate recess 75. In such position it will be apparent that brake shoe 103 has been rotated into engagement with balance wheel 104 and hence the clock movement is not functioning. Since the cab is stationary moreover it will be apparent that shaft 5 is not being rotated to register a fare via the speedometer cable.

Thus the passenger is able to ascertain his fare, and when paid, the operator will again rotate cam 68 clockwise so that recess 75 leaves stud 73 and recess 74 engages therewith, and during this movement the reset levers 85 and 86 will move downwardly and contact the perimeters of cams 40 and 41 in whatever position they may be and rotate them to the position of Figure 3 under the influence of springs 80 and 81. Thus the dials 42 and 43 are returned to the initial position.

Referring to Figure 5, it will be preceived that the conventional electro-magnetic clock movement 7 is in parallel with the solenoid circuit 23 and grounded on the lead 144.

In this context it is to be noted that the arms 19 and 19′ may be adjusted with reference to their relationship. It may furthermore be added that in certain instances the arm 19′ of the radial sweep clutch may be dispensed with, as for example when the sectorial arc enclosed by the two arms would be of such magnitude as would cause the toe of lever 112 to engage the flat portion 145 of cam 108 before stop 17 would be intercepted by arm 19′.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An electrically energized fare indicating meter for taxicabs comprising in combination, an electrically energizable unit, having a source of power in circuit therewith, a primary dial actuating unit connected to said electrically energizable unit, a road-wheel coupled drive-shaft, a conventional clock-movement, a drive-shaft coupled thereto, over-riding clutch means co-acting between said shafts, an associated circuit closing component operably connected to said clock-movement and to said road-wheel coupled drive shaft and a manually operated main switch in said circuit.

2. The meter according to claim 1 which includes an endwise shiftable tongue connected to said electrically energizable unit, at least one pawl on said tongue, a ratchet operable by said pawl, said ratchet constituting part of said fare indicating assembly.

3. An electrically energized fare indicating meter for taxicabs comprising in combination with an electrically energizable unit and a switch for connecting and disconnecting the same from the source of power, a toothed wheel for actuating said switch, a clutch for actuating said toothed wheel, a road-wheel coupled drive-shaft, a chronometrically coupled drive-shaft, said toothed wheel being freely journalled on one of said drive-shafts, and over-riding clutch means co-acting between said road-wheel coupled drive-shaft and said chronometrically coupled drive-shaft, said first mentioned clutch also being secured to one of said shafts and a manually operated main switch also in circuit with said source of power.

4. An electrically energized fare indicating meter for taxicabs comprising in combination with an electrically energizable unit and a switch for connecting and disconnecting the same from a source of power, a toothed wheel for actuating said switch, a radial sweep clutch for actuating said toothed wheel, a road-wheel coupled drive-shaft, a chronometrically coupled drive-shaft, said toothed wheel being freely journalled on one of said drive-shafts, over-riding clutch means coacting between said shafts, said first mentioned clutch also being secured to one of said shafts and a manually operated main switch also in circuit with said source of power.

5. An electrically energized fare indicating meter for taxicabs comprising in combination with a conventional clock-movement, an electrically energizable unit, a switch in circuit therewith, means actuated by said clock-movement for closing said switch, and means operable by said electrical unit following the closing of said switch for opening the same, said unit being in the form of a solenoid, an endwise shiftable tongue connected thereto, at least one pawl on said tongue, a ratchet operated by said pawl, said ratchet constituting part of said fare indicating assembly, said means actuated by said clock-movement consisting of a ratchet wheel, said means operable by said electrical unit embodying an arm having a pawl thereon engageable with said ratchet wheel and operated by said end shiftable tongue to complete a stage of partial rotation initiated by said clock-movement and thereby opening said switch and a manually operated main switch between said source of power and said first mentioned switch.

6. The meter according to claim 1 in which said drive shafts are co-axial.

7. The meter according to claim 3 which includes an endwise shiftable tongue connected to said electrically energizable unit, at least one pawl on said tongue, a ratchet operable by said pawl, said ratchet constituting part of said fare indicating assembly.

8. The structural arrangement according to claim 1 wherein said circuit-closing component is partially operated by said primary dial actuating unit.

9. The structural arrangement according to claim 1 wherein the circuit-closing component is in the form of a wheel mounted on one of said shafts.

RONALD WINCH.

References Cited in the file of this patent

UNITED STATES PATENTS

| Number | Name | Date |
|---|---|---|
| 1,056,671 | Heintz | Mar. 18, 1913 |
| 1,171,889 | Robinson | Feb. 15, 1916 |
| 1,768,073 | Kern | July 24, 1930 |
| 1,806,353 | Johnson et al. | May 19, 1931 |
| 1,823,523 | Apple et al. | Sept. 15, 1931 |